United States Patent [19]

Barth et al.

[11] Patent Number: 5,086,836

[45] Date of Patent: Feb. 11, 1992

[54] RETARDING HEAT TRACING SYSTEM AND METHOD OF MAKING SAME

[75] Inventors: Roy E. Barth, San Marcos; Joseph M. Venable, New Braunfels; Atlee E. Fritz, Seguin; Arthur McDonald, New Braunfels, all of Tex.

[73] Assignee: Thermon Manufacturing Company, San Marcos, Tex.

[21] Appl. No.: 608,576

[22] Filed: Nov. 2, 1990

[51] Int. Cl.⁵ .............................................. F16L 53/00
[52] U.S. Cl. ...................................... 165/164; 165/135; 165/185; 137/340; 29/890.045; 392/468
[58] Field of Search .................... 137/334, 340, 341; 165/164, 185, 135; 394/468; 29/890.045

[56] References Cited

U.S. PATENT DOCUMENTS

| | | | |
|---|---|---|---|
| 2,778,609 | 1/1957 | Peeps | 165/164 |
| 3,355,572 | 11/1967 | Chrow | 392/468 |
| 3,834,458 | 9/1974 | Bilbro et al. | 165/164 |
| 3,972,821 | 8/1976 | Weidenbenner et al. | 165/164 |

Primary Examiner—Albert W. David, Jr.
Attorney, Agent, or Firm—Pravel, Gambrell, Hewitt, Kimball & Krieger

[57] ABSTRACT

A retarding heat tracing system amd method of making same adapted to externally heat a process pipe including a channel member, a heat transfer element, a retarding heat transfer strip made from a retarding heat transfer material, and a plurality of clamping members. The retarding heat transfer strip has a longitudinal cavity which receives the heat transfer element. The external shape of the retarding heat transfer strip substantially conforms to a longitudinal recess of the channel member. The retarding heat transfer strip with heat transfer element is positioned in the recess of the channel member and the clamping members attach the channel member to the process pipe. The retarding heat transfer material optimizes the heat transfer between the heat transfer element and the process pipe while minimizing the heat transfer element heat loss.

22 Claims, 2 Drawing Sheets

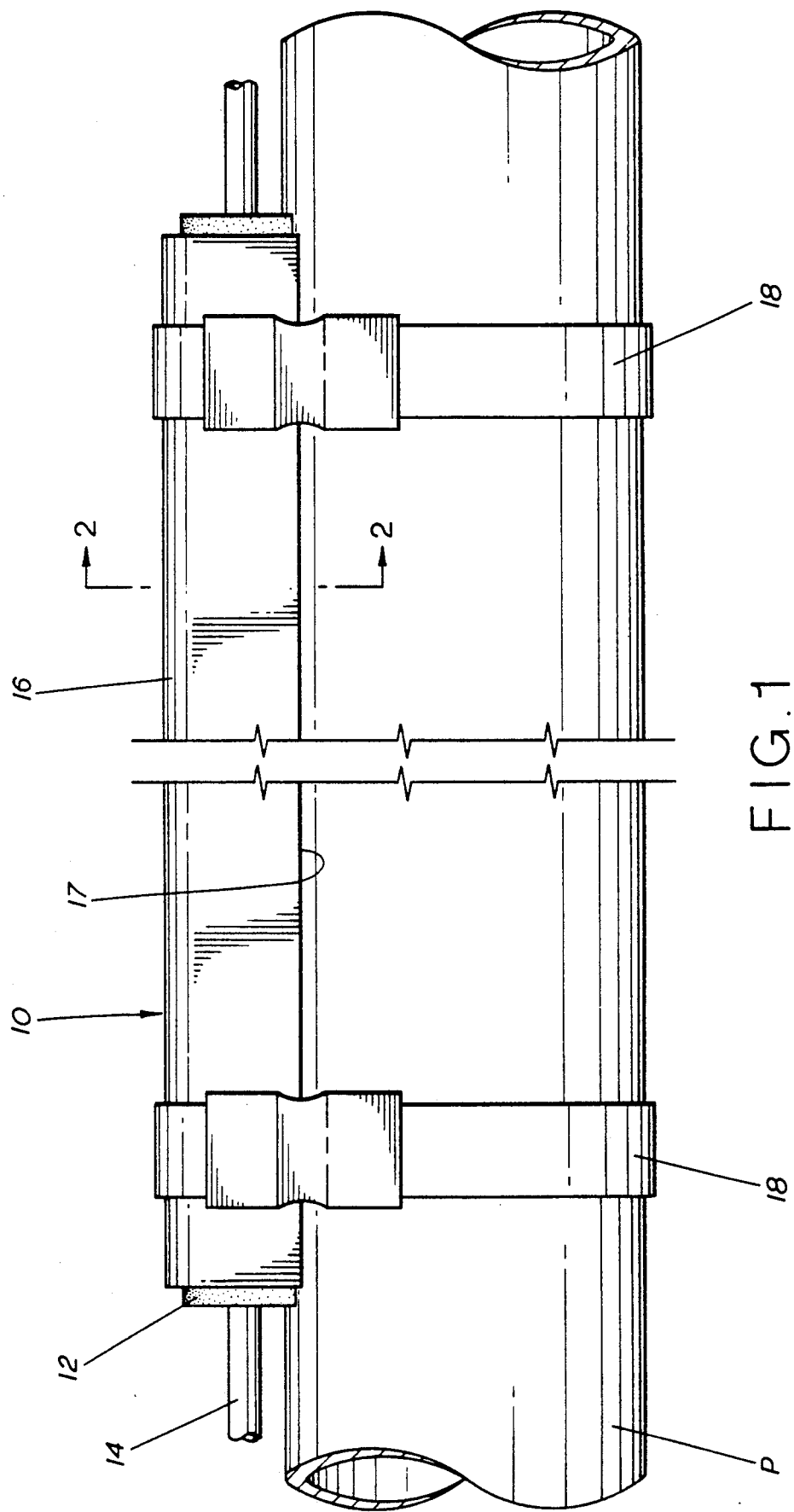

RETARDING HEAT TRACING SYSTEM AND METHOD OF MAKING SAME

BACKGROUND OF THE INVENTION

1. Field of the Invention

The present invention relates generally to a heat transfer apparatus and method, and more particularly to an improved apparatus and method for transferring heat from an externally disposed heat transfer element through a retarding heat transfer material to a pipe.

2. Background

The operation of pumping a fluid through a process pipeline frequently requires that the process pipeline be heated to prevent the fluid from condensing or becoming too viscous to pump through the pipeline. Heating and maintaining the proper temperature of the process pipeline, which aids in regulating the flow of the process fluid, is often accomplished by positioning an external heat transfer element, or tracer line, on the process pipe.

There are two types of external heat transfer elements that are generally used in these situations: (1) an electric heating cable, or (2) a small pipe or tube which is heated by a hot fluid, typically steam, passing therethrough.

Each type of external tracer line (electric cable or steam tubing) can be installed on the process pipe by either of two methods: (1) the convection tracing method, or (2) the conduction tracing method.

Convection tracing consists of attaching the small steam tube or the electric heating cable directly to the external surface of the process pipe. The steam tube, typically small diameter copper or stainless steel tubing, or the electric heating cable may be either spirally wrapped around or run parallel to the process pipe. Convection tracing relies on heat transfer by "spot" contact between the tracer line and the process pipe together with convection (thus termed "convection tracing") to the surrounding air and radiation from the tracer line to the process pipe. The heat transfer characteristics of the convection tracing method are not only low but also unpredictable. The unpredictability of the heat transfer characteristics precludes precise or even reasonable control of the temperature of the process fluid.

In conduction tracing, an external tracer line is attached to the process pipe with a heat transfer material. The primary goal of conduction tracing has been to provide increased heat transfer from the heat transfer element (or tracer line) to the process pipe. The prior art heat transfer materials, such as the cements or putties disclosed in U.S. Pat. No. 3,331,946 and U.S. Pat. No. Re. 29,332, have properties which include a high thermal conductivity, thus, a relatively high heat transfer coefficient, along with good adhesion to metal under varying temperature conditions. Heat transfer cements effect heat transfer by conduction and increase the useable heat output from the tracer line to the process pipe by approximately 1100%. An external steam tracer line bonded with a heat transfer cement is efficient to use from a heat loss standpoint and economical to install.

U.S. Pat. No. 3,331,946 discloses a heat transfer apparatus wherein a heat transfer material or cement is placed in a channel member in a putty-like or plastic state. The channel member with heat transfer material is then pressed downwardly on top of the heat transfer element (a steam tube or electric heating cable) which embeds the heat transfer element in the heat transfer material. U.S. Pat. Nos. 4,123,837 and 4,203,186 disclose methods for applying a heat transfer cement or putty disposed in a channel member to a heat transfer element. U.S. Pat. No. Re. 29,332 discloses a heat transfer assembly in which a flexible and resilient heat transfer material is pre-shaped to closely conform with a heat transfer element and to conform to the internal area of a channel member which is applied over the heat transfer material and heat transfer element at the time of installation. The heat transfer material is extruded or molded under enough pressure and force to virtually eliminate any air pockets or bubbles from the heat transfer material strip.

The primary objective of all of the prior art heat transfer materials has been to increase the amount of heat transferred from the tracer line to the process pipe as compared to a bare tracer line attached to a process pipe. Thus, all the prior art heat transfer materials have a high rate of thermal conductivity. U.S. Pat. No. 3,972,821 states that synthetic resins and plastics used in heat transfer materials have a relatively low thermal conductivity, generally below 10 BTU-In/Hr-Ft$^2$-°F., so the heat transfer material will have dispersed in the synthetic resins and plastics a substantial portion of particulate solid having a significant thermal conductivity of at least 100 BTU-In/Hr-Ft$^2$-°F.

However, the situation often arises in Which it is desirable to use a relatively high temperature heat medium, such as steam, in a heat tracing system to heat and maintain a low temperature process pipe without overheating the process pipe. For example, high temperature steam is oftentimes commonly available for use as the heating medium in an external tracer line; however, prior art heat tracing systems would deliver too much heat for many temperature sensitive applications. There are many process fluids which are very temperature sensitive. A few temperature sensitive process fluids include products such as caustic soda, amines, various acids, etc.

In other situations it may be uneconomical to use a high temperature heat transfer element where less heat would suffice. For example, the use of a steam tracer line with a process pipe which only requires freeze protection will generally heat the process pipe more than necessary for simple freeze protection when attached by prior art methods. This is inefficient and wastes an excessive amount of heat in the heat tracing system.

Similarly, today many heat traced process pipes are designed with more insulation around the process pipe and the heat tracing system, for greater energy efficiency, than in the past. A by-product of increased insulation is that a heat transfer element which formerly would have required the use of a heat transfer material to increase heat conductance to the process pipe now produces too much heat for the more heavily insulated pipe and tracing system.

A current industry practice to mitigate these problems is to reduce heat transfer from the tracer line to the process pipe by inserting spacer blocks between the heat transfer element and the process pipe. This technique has several drawbacks. While this may reduce overall heat transfer to the process pipe, it is very difficult to achieve uniform heat transfer in this manner due to the difficulty of maintaining uniform spacing of the heat transfer element from the process pipe. Overheating or inadequate heating of the process pipe is often experienced. The rate of heat transfer by this technique is very sensitive to the distance between the heat transfer element and the process pipe. This has forced plant engineers to design most of their temperature sensitive process pipelines around electric heat tracing systems which can be accurately controlled, albeit at somewhat higher costs.

It would be advantageous to have a retarding heat tracing system adapted to utilize a high temperature heat transfer element to heat and uniformly maintain a low temperature process pipe without overheating the process pipe. It would also be advantageous to have a retarding heat transfer system which optimizes the heat output of the retarding heat transfer system to the process pipe while minimizing the amount of wasted heat given off by the retarding heat transfer system. Additionally, it would be advantageous to have a heat transfer material in a heat transfer system which can be formed into a heat transfer material strip having a required thermal conductivity which has been calculated for the specific application.

SUMMARY OF THE INVENTION

The present invention is a new and improved retarding heat tracing system using a high temperature heat transfer element to heat and uniformly maintain a low temperature process pipe without overheating the process pipe. The retarding heat tracing system utilizes a retarding heat transfer material that can be extruded or molded into a preshaped, flexible heat transfer strip. The retarding heat transfer strip allows the use of steam or other hot fluids for tracing lower temperature or temperature sensitive process pipelines with great accuracy and precision. The retarding heat transfer material can be provided for a calculated heat transfer requirement for a given application and permits accurate control of heat transfer by using external steam tracing. The retarding heat transfer system using steam tracing can be designed for a given application by precisely determining the heat requirement of the process pipe and then calculating the required thermal conductivity of the retarding heat transfer material. The retarding heat transfer material is molded or extruded into a flexible strip having the required rate of thermal conductivity.

The retarding heat transfer material of the present invention retards the rate at which heat is transferred from the heat transfer element to the process pipe and provides for a range of total heat conductances from the heat transfer element to the process pipe which is below that of prior art heat transfer materials. The retarding heat transfer material of the present invention is preformed into a strip having a cavity to closely conform to the heat transfer element and is shaped externally to closely conform to the internal area of a channel member which is applied over the retarding heat transfer strip and heat transfer element.

The retarding heat transfer strip is composed of a closed cell foamed silicone or other foamed, temperature tolerant plastics or rubbers. The degree of foaming and consequently the density of the retarding heat transfer material can be controlled in the manufacturing process to provide a retarding heat transfer strip and channel system with the specific heat conductance desired for the specific application.

Accordingly, the present invention provides a retarding heat transfer strip which allows the operator to use a high temperature heat transfer element to heat a process pipe with relatively lower heat requirements. The retarding heat transfer material allows for a rang of precisely controllable heat transfer rates between a steam tracer line and a process pipe to enable the use of steam tracing for temperature sensitive process fluids.

The present invention further provides a retarding heat tracing system which is energy efficient in that the system optimizes the amount of heat transferred to the process pipe and minimizes the amount of heat transfer element heat lost to the atmosphere. Additionally, the present invention provides a retarding heat transfer material which resists thermally induced breakdown at temperatures up to and above 400° F.

The present invention also provides a retarding heat transfer strip which is compatible with the use of known channel and attachment methods and which is easily installed, removed, and re-used. The present invention also provides a means to assure a consistent and uniform level of heat transfer between a heat transfer element and a process pipe.

BRIEF DESCRIPTION OF THE DRAWINGS

In order that the features of this invention may be better understood, a detailed description of the invention, as illustrated in the attached drawings, follows.

FIG. 1 is a view illustrating the pre-shaped and pre-formed retarding heat transfer strip and heat transfer element confined by a channel member with clamping members holding the retarding heat tracer system on a process pipe for heat transfer purposes.

DETAILED DESCRIPTION

Figure 3:
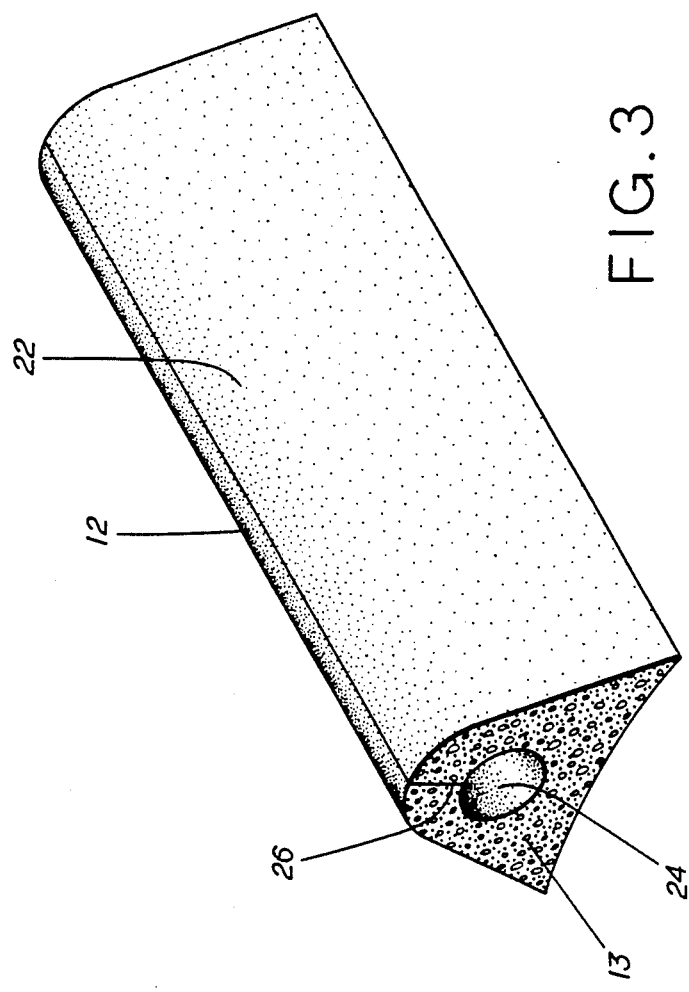
FIG. 3 is a perspective view of the pre-shaped and pre-formed retarding heat transfer strip.
Figure 2:
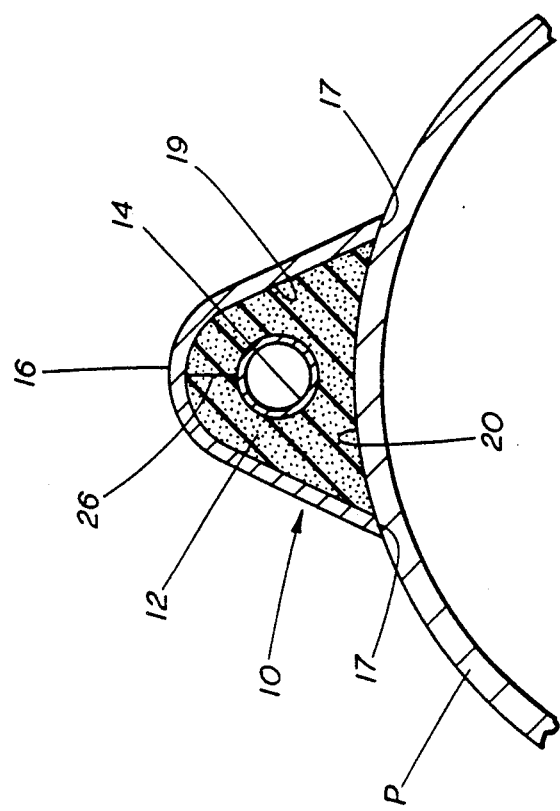
FIG. 2 is a sectional view taken on line 2—2 of FIG. 1.

The present invention relates to a retarding heat tracing system 10 which is adapted to be mounted on a process pipe P. Briefly, the retarding heat tracing system 10 includes a pre-shaped retarding heat transfer strip 12, a heat transfer element 14, a channel member 16, and clamping members 18 for securing the retarding heat tracing system 10 on the process pipe P.

FIG. 1 illustrates the preferred embodiment of the retarding heat tracing system 10 of the present invention. The retarding heat tracing system 10 is mounted on the exterior surface of the process pipe P and installed parallel to the length of the process pipe P.

The retarding heat transfer strip 12 is disposed generally around the heat transfer element 14. Typically, the heat transfer element 14 is a heat transfer media-filled tube and the heat transfer media is commonly steam, otherwise referred as a steam line or steam tracer. The retarding heat transfer strip 12 of the present invention is formed of a retarding heat transfer material 13. The retarding heat transfer material 13 is preferably a predominately closed cell foam material. The retarding heat transfer strip 12 is formed by molding or extruding the retarding heat transfer material 13 into the desired shape. The retarding heat transfer strip 12 is principally intended for use with the channel member 16. The use of the channel member 16 is well known in prior art heat tracing systems for use with other types of heat transfer materials. The channel member 16 has a pair of longitudinally extending edges 17 and a longitudinal recess 19 formed between the longitudinally extending edges 17. The channel member 16 is preferably formed of metal or any other relatively strong material capable of confining the retarding heat transfer strip 12 while retaining the dimensional shape and position of the channel member 16, retarding heat transfer strip 12 and heat transfer element 14 on the process pipe P. Any type of clamping members 18 may be used so long as it retains the channel member 16, the retarding heat transfer strip 12 and the heat transfer element 14 on the process pipe P in the selected shape and position.

Many of the advantages and reasons for using the channel member 16 with traditional heat transfer materials also apply in conjunction with the present invention. The channel member 16 provides physical protection for the heat transfer element 14. The channel member 16 permits the uniform attachment of the heat transfer element 14 to the process pipe P with clamping members 18. The clamping members 18 consist generally of bands or straps. Additionally, if the channel member 16 is slightly smaller in cross-sectional area than the resilient, but compressible, retarding heat transfer strip 12 of the present invention, the channel member 16 slightly compresses the retarding heat transfer strip 12. This serves to keep the heat transfer element 14 in firm contact with the retarding heat transfer strip 12 and also serves to keep the retarding heat transfer strip 12 in firm contact with the process pipe P. Since the retarding heat transfer strip 12 is held in compression, the contact of the heat transfer element 14 with the retarding heat transfer strip 12 and the contact of the retarding heat transfer strip 12 with the process pipe P is maintained in spite of normal expansion and contraction of the various components that result from changing temperatures.

The external shape or configuration 22 of the retarding heat transfer strip 12 of the present invention closely conforms to and preferably is identical to an internal configuration 20 formed by the channel member 16 positioned on the process pipe P. Since the retarding heat transfer strip 12 is flexible and resilient, it will be understood that the exact external shape 22 of the retarding heat transfer strip 12 does not have to be identical to the internal configuration 20 since the retarding heat transfer material 13 may yield and assume such shape after being confined between the process pipe P and the channel member 16.

Additionally, the retarding heat transfer strip 12 contains a longitudinal cavity 24 therein for receiving the heat transfer element 14, commonly a tracer tube or pipe. The longitudinal cavity 24 is predetermined so that when the retarding heat transfer strip 12 is assembled with the heat transfer element 14, the cavity 24 closely conforms to and effectively embeds the heat transfer element 14 within the retarding heat transfer strip 12. The retarding heat transfer strip 12 may also include a slit 26 along the longitudinal axis to allow for installation of the heat transfer element 14 or to allow the retarding heat transfer strip 12 to be installed on a previously emplaced heat transfer element 14. The slit 26 also allows the retarding heat transfer strip 12 to be removed and re-used.

The retarding heat transfer strip 12 is also flexible to permit on site installation as the heat transfer element 14 is set in place. This greatly eases retarding heat tracing system 10 installation as compared to methods which involve factory pre-installation of heat transfer material on a heat transfer element 14. In many cases, ease of installation is directly related to uniformity of installation and uniformity and consistency of system performance. In cases in which flexible copper tubing is used as the heat transfer element 14 the tubing can much more easily be straightened and made to lay flat if the retarding heat transfer strip 12 is not yet in place. This also allows for inspection to avoid what could otherwise be undetected crimping of the heat transfer element 14.

Another advantage of the retarding heat transfer strip 12 of the present invention is the resiliency of the retarding heat transfer material 13 which provides a degree of strain relief for the heat transfer element 14. As the various components of the retarding heat tracing system 10 change dimensions with changing temperature the heat transfer element 14 moves in relation to the process pipe P. The resilient retarding heat transfer strip 12 firmly held around the heat transfer element 14 absorbs much of the strain and yet returns to its original position as the stresses lessen. Resiliency and dimensional stability of the retarding heat transfer strip 12 are necessary to maintain consistent and predictable heat transfer rates. If the retarding heat transfer strip 12 significantly changes dimensions or if it allows too much movement of the heat transfer element 14 the total heat conductance of the retarding heat transfer system 10 will likely deviate from the original set of desired parameters.

Heat transfer elements 14, such as pipes and tubes, can operate at temperatures up to and above 400° F. The retarding heat transfer material 13 of the present invention is able to withstand these high temperatures without significant breakdown or degradation. The retarding heat transfer material 13 may be a foamed silicone composition or it may be constructed of a foam of other high temperature tolerant plastics or rubbers including, but not limited to members of the fluoropolymer family, for example the polytetrafluoroethylene material sold under the trademark "Teflon" (a registered trademark of E. I. Du Pont de Nemours and Company, Inc.)

If desired, the retarding heat transfer strip 12 may be cross-linked for purposes such as increasing the strength, resiliency, and durability of the retarding heat transfer strip 12. Cross-linking may be achieved chemically or by radiation or by any other method. Cross-linking is not, however, a requirement for the invention and it will be understood that adequate retarding heat transfer strips 12 of the present invention can be made without cross-linking.

Thermal performance of said retarding heat transfer strips 12 is best characterized by two values. Thermal conductivity of the retarding heat transfer material 13 is described by the well known K factor which describes the rate at which heat is conducted through a specific material. The value for a K factor is given in units of BTU-In/Hr-Ft$^2$-°F. The retarding heat transfer material 13 of the present invention exhibits a thermal conductivity in the range of not less than 0.10 BTU-in/hr-ft$^2$-°F. to not greater than 1.5 BTU-in/hr-ft$^2$-°F., more preferably between 0.15 to 0.75 BTU-in/hr-ft$^2$-°F. Prior art heat transfer materials used for transferring heat from a heat transfer element to a process pipe have had thermal conductivities ranging from 1.5 to greater than 100 BTU-in/hr-ft$^2$-°F.

The retarding heat transfer strip 12 of the present invention is also distinguished by the performance characteristics which can be achieved by the total installed retarding heat tracing system 10 utilizing the new retarding heat transfer strip 12. A standard measurement of heat tracing performance used in the industry is conductance and, specifically, conductance of tracer, $C_t$.

The $C_t$ value is experimentally derived to reflect the normalized heat transfer coefficient of the heat transfer element 14. The coefficient is normalized in terms of a "per unit length", generally reduced to feet. The resulting $C_t$ is commonly given in units of BTU/hr-ft-°F. If $Q=U*A*\Delta T$, where $Q$=heat loss (BTU/hr), U=overall heat transfer coefficient (BTU/hr-ft$^2$-°F.), $\Delta T$=temperature gradient, and A=surface area, then for purposes of heat tracing we can arbitrarily define $U*A$ as conductance of tracer, $C_t$, so as to eliminate the very complex variables involved in calculating $U*A$. The complex variables involved in calculating $U*A$ include variables such as thickness of the heat transfer strip 12, size of the heat transfer element 14, size of the process pipe P, area of contact between the heat transfer strip 12 and the process pipe P, and several other factors. The $C_t$ value is experimentally derived by measuring Q and $\Delta T$ on a particular heat tracing system 10 installation.

The retarding heat transfer strip 12 of the present invention is further distinguishable from prior art heat transfer materials in terms of overall $C_t$ on heat tracing systems installed in a comparable manner. Heat tracing systems installed with the new retarding heat transfer strips 12 result in $C_t$ values in a range considerably below those achieved or contemplated with prior art heat transfer materials. To illustrate this point, the table below compares ranges of $C_t$ values for heat tracing systems, based on the size of the heat transfer element or tracer line, by the categories of prior art cements, bare tracers, and the retarding heat transfer strip 12 of the present invention. Because $C_t$ is dependent in part on the geometric relationship between tracer size and process pipe P size, it is necessary to compare $C_t$ values on the basis of tracer line diameter. The size of the process pipe P has less effect on the $C_t$ value and thus has not been given in this table.

| | CONDUCTANCE OF TRACER, $C_t$ (BTU/hr-ft-°F.) | | |
|---|---|---|---|
| TRACER SIZE | RETARDING HEAT TRANSFER STRIP | BARE TRACER | PRIOR ART CEMENT |
| ⅛ INCH | .025 TO .500 | .258 TO .603 | .611 TO 8.0 |
| ¼ INCH | .027 TO .700 | .343 TO .80 | .814 TO 8.0 |
| ⅜ INCH | .035 TO 1.000 | .517 TO 1.2 | 1.221 TO 8.0 |

Looked at in this fashion, the $C_t$ ranges achievable with different heat transfer materials is clear. Prior art heat transfer materials provide heat transfer rates approaching that of a jacketed or gutline traced pipe in which the tracer pipe externally surrounds the process pipe or is internally inserted in the process pipe, respectively. The retarding heat transfer strips 12 of the present invention provide predictable uniform heat transfer rates below those provided by prior art heat transfer materials. This allows high temperature steam tracers to be used for low load heat tracing requirements.

Additionally, the retarding heat tracing system 10 produces a decreased amount of condensate than prior art heat tracing systems due to the decreased heat transfer rate which effectively reduces the number of traps required to remove the condensate from the heat transfer system. Furthermore, the overall process pipe P and heat tracing system 10 can be more heavily insulated for better system energy conservation effectiveness than would be possible utilizing prior art heat transfer materials.

The $C_t$ values of heat tracing systems 10 using the retarding heat transfer strips 12 of the present invention may overlap the $C_t$ values achievable with a bare tracer system; however, the present invention provides many advantages not attainable with a bare tracer system. The heat tracing system 10 with the retarding heat transfer strips 12 provides a much more uniform rate of conductance because the retarding heat transfer strip 12 maintains the heat transfer element 14 at a uniform distance from the process pipe P. The use of the retarding heat transfer strip 12 makes the heat tracing system 10 much less sensitive to the quality of the installation and allows for a much more precise choice of $C_t$. The conductance of a bare tracer or a tracer installed with spacer blocks is extremely sensitive to the quality of the installation. This big disadvantage is overcome by the heat tracing system 10 of the present invention.

Altering processing variables during manufacturing of the retarding heat transfer strip 12 permits easy variation and accurate control of the thermal conductivity of the retarding heat transfer material 13. While prior art heat transfer materials have attempted to eliminate bubbles and entrained air, in the present case air or gas bubbles or cells are used to make the material less dense and to lower the heat transfer coefficient. By using methods known by those skilled in the art, the degree of foaming (size and number of both open and closed cells) of the retarding heat transfer material 13 can be accurately controlled and varied. Those skilled in the art will recognize that the heat transfer coefficient and related $C_t$ of the heat tracing system 10 are proportional to the air or cell density of the retarding heat transfer material strip 12. Alternatively, the $C_t$ of the heat tracing system 10 may be varied by adjusting the dimensions of the heat transfer strip during the manufacturing process in order to increase or lessen the distance between the heat transfer element and the process pipe.

The foregoing disclosure and description of the invention is illustrative and explanatory thereof, and various changes in the size, shape, and materials, as well as in the details of the illustrative construction and assembly, may be made without departing from the spirit of the invention.

We claim:

1. A retarding heat tracing system adapted to externally heat a process pipe which is to be maintained at a temperature within a specific temperature range, comprising:

a channel member having a pair of longitudinally extending edges and a longitudinal recess formed therebetween, said longitudinally extending edges abutting the process pipe;

a heat transfer element extending longitudinally within said longitudinal recess, said heat transfer element being at a temperature substantially higher than the specified temperature range of the process pipe;

a retarding heat transfer strip disposed between said pipe and said heat transfer element, said retarding heat transfer strip having an external shape substantially conforming to said longitudinal recess of said channel member and positioned in said longitudinal recess between said channel member and process pipe, wherein said retarding heat transfer strip maintain said heat transfer element out of direct contact with the process pipe;

means for attaching said channel member to the process pipe; and wherein said retarding heat transfer strip is made of a retarding heat transfer material for optimizing the heat transfer between said heat transfer element and the process pipe, said retarding heat transfer material having a thermal conductivity no greater than 1.5 BTU-In/HR-Ft$^2$-°F. such that the heat transferred from said heat transfer element to the process pipe maintains the process pipe at a temperature within the specific temperature range.

2. The system according to claim 1, wherein:
said heat transfer strip has a longitudinal cavity for receiving said heat transfer element.

3. The system according to claim 1, wherein said retarding heat transfer strip maintains said heat transfer element a uniform distance from the process pipe.

4. The system according to claim 1, wherein said heat transfer element is a heat transfer media-filled tube.

5. The system according to claim 4, wherein said heat transfer media is steam.

6. The system according to claim 1, wherein said retarding heat transfer strip includes a longitudinal slit for installing said heat transfer element in said longitudinal cavity.

7. The system according to claim 1, wherein said retarding heat transfer material has a coefficient of thermal conductivity in the range of 0.10 to 1.50 BTU-In/Hr-Ft$^2$-°F.

8. The system according to claim 7, wherein said retarding heat transfer material is foamed silicone.

9. The system according to claim 8, wherein said retarding heat transfer material is a substantially closed-cell foamed silicone.

10. The system according to claim 1, wherein said retarding heat transfer material has a coefficient of thermal conductivity in the range of 0.15 to 0.75 BTU-In/Hr-Ft$^2$-°F.

11. A retarding heat tracing system adapted to externally heat a process pipe which is to be maintained at a temperature within a specified temperature range, comprising:
a channel member having a pair of longitudinally extending edges and a longitudinal recess formed therebetween, said longitudinally extending edges abutting the process pipe;
a heat transfer element extending longitudinally within said longitudinal recess, wherein said heat transfer element is a heat transfer media-filled tube being at a temperature substantially higher than the specified temperature range of the process pipe;
a retarding heat transfer strip having a longitudinal cavity for receiving said heat transfer element, said retarding heat transfer strip having an external shape substantially conforming to said longitudinal recess of said channel member, said retarding heat transfer strip being positioned in said longitudinal recess between said channel member and process pipe, wherein said retarding heat transfer strip maintains said heat transfer element out of direct contact with the process pipe and a uniform distance from the process pipe;
a plurality of clamping members for attaching said channel member to the process pipe; and
wherein said retarding heat transfer strip is made of a retarding heat transfer material for optimizing the heat transfer between said heat transfer element and the pipe, said retarding heat transfer material having a thermal conductivity no greater than 1.5 BTU-In/Hr-Ft$^2$-°F. such that the heat transferred from said heat transfer element to the process pipe maintains the process pipe at a temperature within the specified temperature range.

12. The system according to claim 11, wherein said retarding heat transfer material has a coefficient of thermal conductivity in the range of 0.10 to 1.50 BTU-In/Hr-Ft$^2$-°F.

13. The system according to claim 11, wherein said heat transfer media is steam.

14. The system according to claim 11, wherein said retarding heat transfer material is foamed silicone.

15. The system according to claim 14, wherein said retarding heat transfer material is a substantially closed-cell foamed silicone.

16. The system according to claim 11, wherein said retarding heat transfer material has a coefficient of thermal conductivity in the range of 0.15 to 0.75 BTU-In/Hr-Ft$^2$-°F.

17. A method of making a retarding heat tracing system adapted for mounting on a process pipe which is to be maintained at a temperature within a specified temperature range, wherein the retarding heat tracing system has a channel member, a retarding heat transfer strip, and a heat transfer element, the improvement comprising the steps of:
preparing a retarding heat transfer material having a coefficient of thermal conductivity no greater than 1.5 BTU-In-Hr-Ft$^2$-°F. and designed for the required heat transfer application and is such that the heat transferred from said heat transfer element to the process pipe maintains the process pipe at a temperature within the specified temperature range;
preshaping said retarding heat transfer material to a flexible shape-retaining elongated strip prior to installing said retarding heat transfer material on the process pipe;
preforming said retarding heat transfer strip with a longitudinal cavity for said heat transfer element such that said heat transfer strip maintains said heat transfer element out of direct contact with the process pipe when mounted to the process pipe;
inserting said heat transfer element into said longitudinal cavity after the preforming thereof;
said preshaping including shaping the external surface of said retarding heat transfer strip to substantially conform to a longitudinal recess of said channel member.

18. The method set forth in claim 17, including:
slitting said retarding heat transfer strip to insert said heat transfer element into said cavity.

19. The method set forth in claim 17, including:
positioning said channel member over said preshaped retarding heat transfer strip with said heat transfer element;
mounting said retarding heat tracing system on the process pipe; and
installing clamping members around said channel member and the process pipe to secure the retarding heat tracing system to the process pipe.

20. A method of making a retarding heat tracing system adapted for mounting on a process pipe which is to be maintained at a temperature within a specified temperature range, wherein the retarding heat tracing system has a channel member, a retarding heat transfer strip, and a heat transfer element, the improvement comprising the steps of:

preparing a retarding heat transfer material having a coefficient of thermal conductivity no greater than 1.5 BTU-In/Hr-Ft$^2$-°F. designed for the required heat transfer application and is such that the heat transferred from said heat transfer element to the process pipe maintains the process pipe at a temperature within the specified temperature range;

preshaping said retarding heat transfer material to a flexible shape-retaining elongated strip prior to installing said retarding heat transfer material on the process pipe;

preforming said retarding heat transfer strip with a longitudinal cavity for said heat transfer element such that said heat transfer strip maintains said heat transfer element out of direct contact with the process pipe when mounted to the process pipe;

slitting said retarding heat transfer strip to insert said heat transfer element into said cavity;

inserting said heat transfer element into said longitudinal cavity after the preforming thereof;

said preshaping including shaping the external surface of said retarding heat transfer strip to substantially conform to a longitudinal recess of said channel member;

positioning said channel member over said preshaped retarding heat transfer strip with said heat transfer element;

mounting said retarding heat tracing system on the process pipe; and installing clamping members around said channel member and the process pipe to secure the retarding heat tracing system to the process pipe.

21. A retarding heat tracing system adapted to externally heat a process pipe which is to be maintained at a temperature within a specified temperature range, comprising:

a channel member having a pair of longitudinally extending edges and a longitudinal recess formed therebetween, said longitudinally extending edges abutting the process pipe;

a heat transfer element extending longitudinally within said longitudinal recess, said heat transfer element being at a temperature substantially higher than the specified temperature range of the process pipe;

a retarding heat transfer strip disposed between said pipe and said heat transfer element, said retarding heat transfer strip having an external shape substantially conforming to said longitudinal recess of said channel member and positioned in said longitudinal recess between said channel member and process pipe, wherein said retarding heat transfer strip maintains said heat transfer element out of direct contact with the process pipe;

means for attaching said channel member to the process pipe; and wherein said retarding heat transfer strip is made of a foamed silicone material for optimizing the heat transfer between said heat transfer element and the process pipe, said foamed silicone material having a thermal conductivity no greater than 1.5 BTU-In/Hr-FT$^2$-°F. such that the heat transferred from said heat transfer element to the process pipe maintains the process pipe at a temperature within the specified temperature range.

22. The system according to claim 21, wherein said retarding heat transfer material has a coefficient of thermal conductivity in the range of 0.15 to 0.75 BTU-In/Hr-Ft$^2$-°F.

* * * * *